(12) United States Patent
Mutha et al.

(10) Patent No.: US 12,441,519 B2
(45) Date of Patent: Oct. 14, 2025

(54) PCR FLEXIBLE TUBE CONTAINER

(71) Applicant: ALBEA SERVICES, Gennevilliers (FR)

(72) Inventors: Nitin Mutha, Gennevilliers (FR); Thomas Venator, Gennevilliers (FR)

(73) Assignee: ALBEA SERVICES, Gennevilliers (FR)

( * ) Notice: Subject to any disclaimer, the term of this patent is extended or adjusted under 35 U.S.C. 154(b) by 239 days.

(21) Appl. No.: 17/962,940

(22) Filed: Oct. 10, 2022

(65) Prior Publication Data

US 2023/0112847 A1 Apr. 13, 2023

(30) Foreign Application Priority Data

Oct. 12, 2021 (EP) ..................... 21202246

(51) Int. Cl.
*B65D 35/14* (2006.01)
*B65D 35/10* (2006.01)
*B65D 65/40* (2006.01)

(52) U.S. Cl.
CPC ............. *B65D 35/14* (2013.01); *B65D 35/10* (2013.01); *B65D 65/40* (2013.01); *B65D 2565/384* (2013.01)

(58) Field of Classification Search
CPC ........ B65D 35/14; B65D 35/10; B65D 65/40; B65D 2565/384
See application file for complete search history.

(56) References Cited

U.S. PATENT DOCUMENTS

| | | | |
|---|---|---|---|
| 11,772,866 B2 * | 10/2023 | Soto ...................... | B65D 25/28 220/592.2 |
| 2002/0014501 A1 | 2/2002 | Nyman et al. | |
| 2023/0020804 A1 * | 1/2023 | Kawasaki .............. | B65D 75/08 |
| 2023/0405982 A1 * | 12/2023 | Limatibul ............. | B32B 27/306 |

FOREIGN PATENT DOCUMENTS

FR 2996534 A1 4/2014
WO 2009112752 A1 9/2009

OTHER PUBLICATIONS

FR2110943, "Office Action," Jul. 12, 2022, 8 pages.

* cited by examiner

*Primary Examiner* — Jeffrey R Allen
(74) *Attorney, Agent, or Firm* — Kilpatrick Townsend & Stockton LLP

(57) ABSTRACT

A flexible tube container comprising a side wall formed from a multi-layer polymeric material, the side wall comprising a longitudinal weld or join, the multi-layer polymeric material comprising a thickness of between 200 and 400 micrometers, said multi-layer polymeric material comprising at least one layer of virgin polyolefin based and at least one layer of post-consumer resin or recycled material, wherein the multi-layer polymeric material is produced with a step of pushing action towards the interior of the sheet with no subsequent extrusion or lamination step, and the layer of virgin polyolefin is an outermost layer.

16 Claims, 5 Drawing Sheets

PCR FLEXIBLE TUBE CONTAINER

REFERENCE TO RELATED APPLICATION

This application is related to and claims priority benefits from EP Application No. EP21202246.1, filed Oct. 12, 2021, and entitled PCR FLEXIBLE TUBE CONTAINER, the entire content of which is incorporated herein by this reference.

TECHNICAL FIELD

The present invention relates to a flexible tube container, also call squeezable tube container.

BRIEF SUMMARY

The present invention relates to a flexible tube container, also call squeezable tube container, formed from a multi-layer polymeric material. Said tubes are designed to store and distribute liquid to pasty products. These flexible tubes include a head and a flexible skirt that is itself obtained from a plane multi-layer sheet structure including several layers of different plastics. The plane multi-layer sheet structure used within the context of this invention is cut out from a sheet which includes several layers of different plastics, which combine the various functions that a tube skirt must fulfill such as flexibility, dead-fold properties, act as a barrier to diffusion, be able to accept printing, etc.

Multi-layer polymeric material can be manufactured by blown film process, such as the process described in the international application WO2008/135755. In a blown film process, a cylindrical multi-layer sheet structure is co-extruded and inflated using a ring shaped straight manifold co-extrusion die. The multi-layer sheet structure is inflated so that it forms a thin-walled bubble which is then nipped and flattened.

This process allows in particular to obtain a multi-layer polymeric material which have good barrier properties against diffusion, by using polyethylene based layers and by inserting at least one barrier layer, typically a non-metallic barrier layer made of ethylene-vinyl alcohol (EVOH), for example.

These multi-layer polymeric materials show very good results in terms of chemical and mechanical resistance but also in terms of manufacturing processability and final appearance.

However, with the increased awareness of environmental issues, it is very desirable to be able to recycle plastic materials, in particular those used in packaging. One such source of plastic materials is known as Post-Consumer Recycled (PCR). In general, three types of polymers are available as PCR, these being polyethylene terephthalate (PET), polypropylene (PP) and polyethylene (PE).

It is a request to incorporate more and more quantity of PCR material in the packaging.

The attempt of the applicant to develop a multi-layer polymeric material including as much as possible of PCR material and obtained by the blown film technology has failed. This technology leads to a multi-layer polymeric material with a too bad quality of the external surface (outermost layer) to be printable and to offer a good quality perception to the user. Indeed, the external surface is too rough and shows dots or "fisheye" due to the elliptical elongation of impurities during the manufacturing process. These defects are mainly due to particle contaminants from recycled polyethylene.

The present invention attempts to solve at least one of the above mentioned problems and propose a flexible tube container comprising a flexible tube container comprising a side wall formed from a multi-layer polymeric material, the side wall comprising a longitudinal weld or join, the multi-layer polymeric material comprising a thickness of between 200 and 400 micrometers, said multi-layer polymeric material comprising at least one layer of virgin polyolefin based and at least one layer of post-consumer resin or recycled material, wherein the multi-layer polymeric material is produced with a step of pushing action towards the interior of the sheet with no subsequent extrusion or lamination step, and the layer of virgin polyolefin is an outermost layer.

Advantageously, the step of pushing action towards the interior of the sheet is obtained by casting process or calendering process. In other words, advantageously, the multi-layer polymeric material is produced as a cast sheet or a calendered sheet. With the step of pushing action towards the interior of the sheet, advantageously co-extrusion casting or calendering process, the multi-layer polymeric material is compressed during its formation, for example during its passage in the casting roll or in calender. The pushing action, for example by rolls, involves, as a result, a smooth surface. Indeed, the particles of the PCR layer are pushed towards in the interior of the sheet and covered with the virgin PE outermost layer.

Advantageously, a complete multi-layer polymeric material is obtained, advantageously by casting method or calenderer method. In other word, the multi-layer polymeric material is not a material obtained by assembling individual layers pre-made by any method.

Before printing, the particles are still visible through the clear virgin PE layer, but the particles cannot be felt anymore and do not interfere in the surface printing process like flexo printing, digital printing, screen printing, or other printing methods known of the one skilled in the art.

The multi-layer polymeric material according to the invention offers a very good surface quality particularly well adapted for cosmetic segment aesthetic requirements as the defects linked to the use of PCR are removed and hides.

We mean by post-consumer resin or post-consumer recycled material (PCR material), a material from reprocessed plastics generated by households or commercial, industrial and institutional facilities in their role of end user, in other word a material from a content that can no longer be used for the purpose for which it was designed, according to, for example, the definition of the ISO 14021:2016 standard.

Typically, those skilled in the art understand that it is not a material from pre-consumer material, also called post-process recycled material or regrind scrap that is collected at the plastic molding factory during the process.

Advantageously, the virgin PE outermost layer is thin in order to keep a good ratio of PCR regarding the multi-layer polymeric material. Thin virgin PE outermost layer is efficient because of the step of pushing action towards the interior of the sheet used, such as casting or calendering process.

The addition of a thick PE outermost layer to hide the bad quality of the PCR layer can be an easy solution but this strategy is not sufficient if you need to have a high level of PCR content into the multi-layer polymeric material.

The invention can also comprise any of the following features taken individually or in any technically possible combination:

the post-consumer resin or recycled material represents at least 20% wt of the multi-layer polymeric material, the post-consumer resin or recycled material represents at least 30% wt of the multi-layer polymeric material,
the post-consumer resin or recycled material represents at least 50% wt of the multi-layer polymeric material,
the post-consumer resin or recycled material represents at least 60% wt of the multi-layer polymeric material,
the at least one layer of post-consumer resin or recycled material is inner layer(s),
the at least one layer of post-consumer resin or recycled material is adjacent to the outermost layer,
the at least one layer of post-consumer resin or recycled material is adjacent to the innermost layer,
the multi-layer polymeric material comprises at least one barrier layer,
the at least one barrier layer is made of EVOH,
the multi-layer polymeric material comprises tie layers on both side of each barrier layer,
the multi-layer polymeric material comprises surface layers, the surface layers are of the same composition,
the surface layers are made of PE,
the surface layers are made of LLDPE,
the number of defects with an area greater than 0.5 mm$^2$ located on the outermost layer is under 5 defects/sqm,
the number of defects with an area greater than 0.5 mm$^2$ located on the outermost layer is under 3 defects/sqm,
the number of defects with an area greater than 0.5 mm$^2$ located on the outermost layer is under 2 defects/sqm,
the number of defects with an area greater than 0.5 mm$^2$ located on the outermost layer is under 1 defects/sqm,
the number of defects with an area greater than 0.5 mm$^2$ located on the outermost layer is under 0.5 defects/sqm,
the multi-layer polymeric material comprises at least three layers,
the multi-layer polymeric material comprises at least five layers,
the multi-layer polymeric material comprises at least seven layers,
the multi-layer polymeric material comprises at least nine layers,
the post-consumer resin or recycled material is PE,
the post-consumer resin or recycled material is HDPE,
the at least one layer of post-consumer resin or recycled material comprises master batch such as colorant master batch like white master batch and/or anti-UV additive,
the outermost layer has a thickness of at most 60 μm,
the outermost layer has a thickness of at most 50 μm,
the outermost layer has a thickness of at most 45 μm,
the outermost layer has a thickness of at most 35 μm,
the outermost layer has a thickness of at most 25 μm,
the outermost layer has a thickness of at least 20 μm,
the outermost layer has a thickness of at least 30 μm,
the outermost layer has a thickness of at least 40 μm,
the outermost layer has a thickness comprises between 20 and 55 μm,
the outermost layer has a thickness comprises between 20 and 45 μm,
the outermost layer has a thickness comprises between 20 and 35 μm,
the outermost layer has a thickness comprises between 20 and 25 μm,
the outermost layer has a thickness comprises between 30 and 50 μm,
the outermost layer has a thickness comprises between 40 and 50 μm,
the multi-layer polymeric material is symmetrical,
the flexible tube container comprises a tube head and/or a cap, the post-consumer resin or recycled material represents at least 20% wt of the container,
the flexible tube container comprises a tube head and/or a cap, the post-consumer resin or recycled material represents at least 30% wt of the container,
the flexible tube container comprises a tube head and/or a cap, the post-consumer resin or recycled material represents at least 40% wt of the container,
the flexible tube container comprises a tube head and/or a cap, the post-consumer resin or recycled material represents at least 50% wt of the container.

BRIEF DESCRIPTION OF THE DRAWINGS

The invention will be better understood thanks to the following description which is only indicative and which is not intended to limit said invention, accompanied with the following figures.

DETAILED DESCRIPTION

In the context of the invention, the following definitions and abbreviations are used.

As used herein, the terms "outer", "inner", "upper" and "lower", and the like, used with respect to the various layers refer to the multi-layer polymeric material with the intended outer or upper surface uppermost and the intended inner or lower (product-contacting) surface lowermost. In addition, these terms and the terms "over", "under" or "on" do not imply that the layers are necessarily directly in contact. For example, the upper layer being "formed on" the barrier layer does not preclude the presence of one or more other intervening layers located between the upper layer and the barrier layer. Furthermore, layers may be provided under the inner layer, i.e. between the inner layer and the product, or above the outer layer (like decorative layers).

The term "container" is used herein to refer to an item which may contain a product. Such products are usually liquids, gels or pastes. Preferred containers include tubes and pouches. The container may further comprise a lid or a cap and, if necessary, attachment means for the lid or cap (such as a tube head or shoulder) before it forms a useful commercial container. As a consequence, the multi-layer polymeric material of the invention can form a tube skirt, an insert of a tube head or a combination thereof.

The term "flexible" as used herein describes a sheet or a container made thereof which can bend or be bent easily and which does not break (unless it is bent too much). Herein in connection with the containers the term flexible indicates that if the container is subjected to a force, for example, by being filled with a liquid, or by applying pressure with a finger or a hand, it will change its form without breaking. A flexible container can also be considered to be a "squeezable" container or a "collapsible" container.

The term "tie layer" refers to a layer which is placed between two layers with the object of ensuring that the two layers are joined together.

The term "polymer" refers to a large molecule, or macromolecule, composed of many repeated subunits.

The term "polyolefin" refers to any of a class of polymers produced from a simple olefin as a monomer.

The term "PE" refers to polyethylene.

The term "LDPE" refers to low density polyethylene.

The term "LLDPE" refers to linear low density polyethylene.

The term "MDPE" refers to medium density polyethylene.

The term "HDPE" refers to high density polyethylene.

The term "PP" refers to polypropylene.

The term "EVOH" refers ethylene-vinyl alcohol.

The term "EMA" refers to ethylene methyl acrylate copolymer.

As illustrated in FIGS. 1 to 5, the invention relates to a flexible tube container 1 comprising a tube head 10 and a skirt 100 formed from a multi-layer polymeric material 200 produced with a step of pushing action towards the interior of the sheet.

The step of pushing action takes place during the formation of the multi-layer polymeric material 200.

Figure 3:
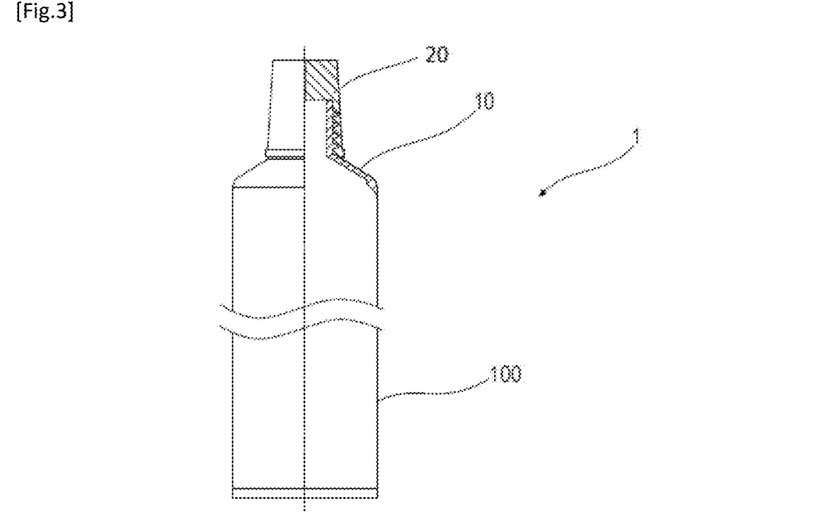
FIG. 3 is a schematic representation of a flexible tube container according to a second embodiment of the present invention.

Advantageously, the step of pushing action towards the interior of the sheet is obtained by casting process or calendering process. In other words, advantageously, the multi-layer polymeric material 200 is produced as a cast sheet or as a calendered sheet. Advantageously, as represented at FIG. 3, the flexible tube container 1 can also comprise a cap 20.

Figure 1:
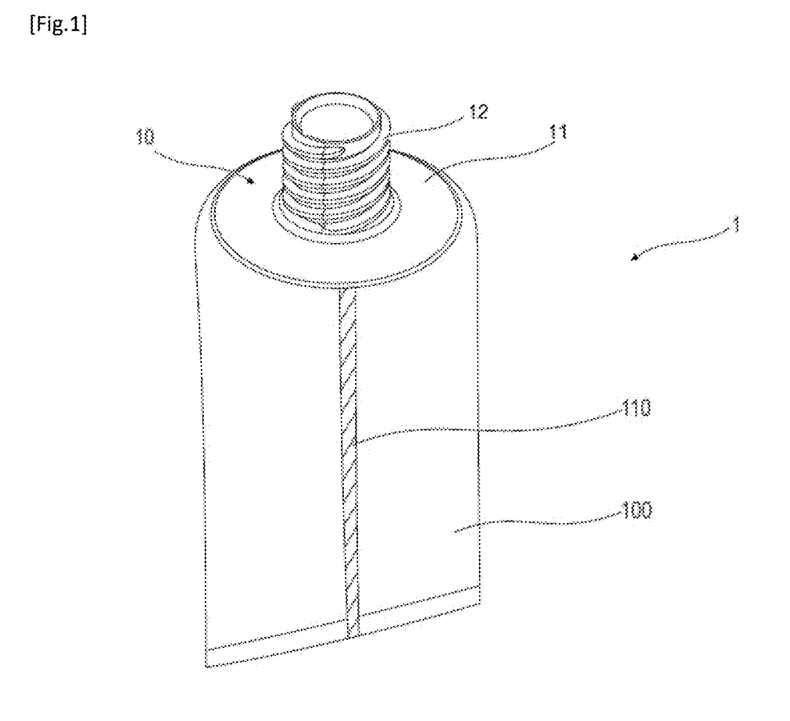
FIG. 1 is a schematic representation of a flexible tube container according to an embodiment of the present invention.
Figure 2:
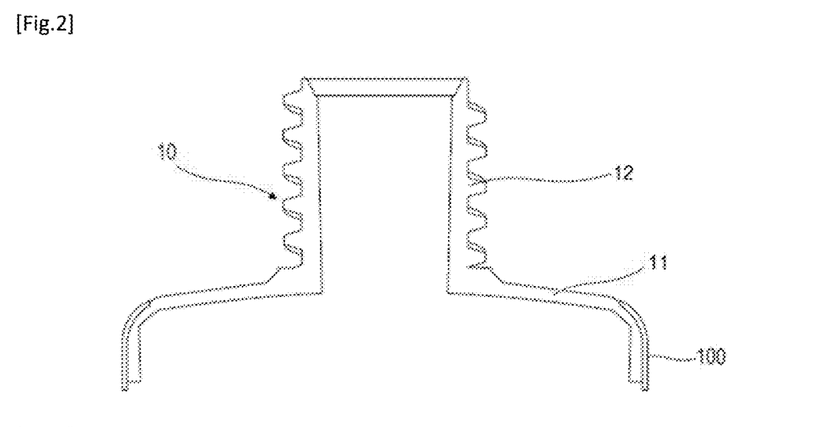
FIG. 2 is a sectional view of part of FIG. 1.

The tube head 10 comprises a wall with a distribution opening and is attached or linked to the tube skirt 100. According to an embodiment, the head 10 can comprise a shoulder 11 and a neck 12. The neck advantageously comprises thread. The cap can be screwed on the neck in order to block the distribution opening.

According to another embodiment, the cap can be snapped on the neck, the neck comprising snap function such as an annular rib cooperating with flanges or tabs of the cap.

Figure 4:
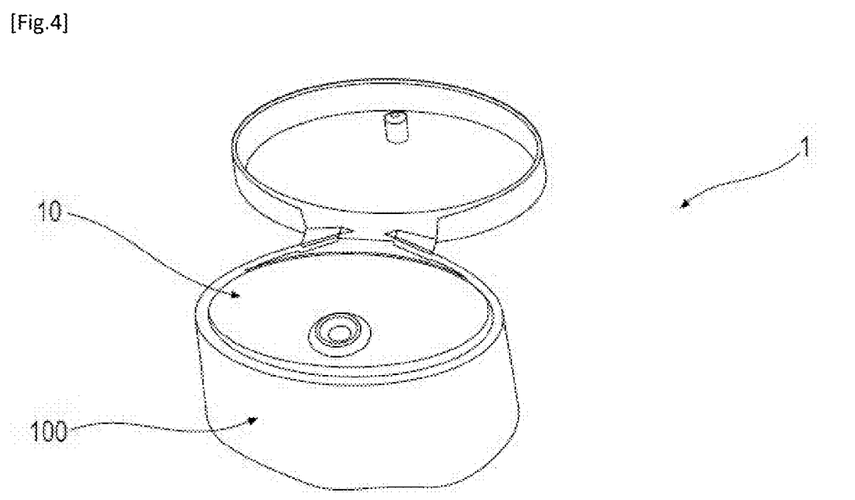
FIG. 4 is a schematic representation of a flexible tube container according to another embodiment of the present invention.
Figure 5:
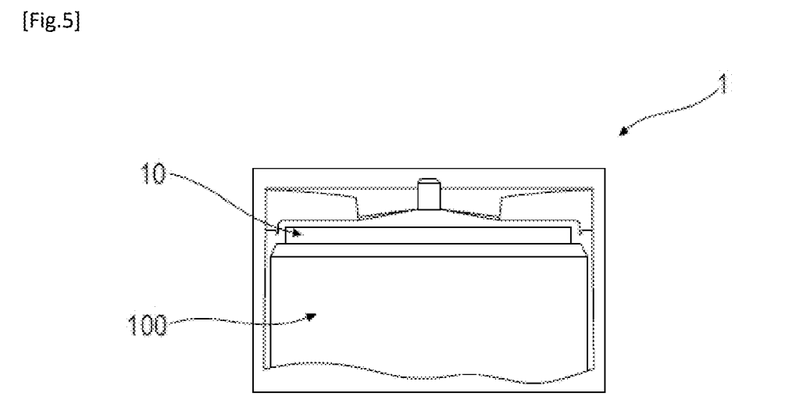
FIG. 5 is a sectional view of part of FIG. 4.

According to yet another embodiment represented at FIGS. 4 and 5, the tube can comprise a head 10 with no neck. In this configuration, the head comprises only the wall with a distribution opening, this wall being attached directly to the skirt. This shoulderless configuration allows to reduce the quantity of material used to form the head.

According to an embodiment, the tube 1 can also comprise an insert located inside the tube 1 and attached to the internal surface of the head 10. In this case, the cap advantageously comprise a punch configured to pierce or cut the insert during the first use of the tube 1. More advantageously, the tube 1 according to this embodiment comprises a ring mounted on the head. Said ring allows to maintain the cap in a first position, called waiting position, in which the pinch is kept at distance from the insert.

As illustrated in FIG. 1, the skirt 100 comprises a longitudinal weld or join 110. Advantageously, this longitudinal weld 110 is obtained by overlapping the edges of a multi-layer polymeric material 200 forming the skirt 100. More particularly, portions of the multi-layer polymeric material are folded onto each other in a tubular configuration such that a first side edge of the multi-layer polymeric material covers a second side edge of the multi-layer polymeric material. Then, an upper surface of the multi-layer polymeric material is in facing contact with a lower surface of the multi-layer polymeric material. An overlap side seam is formed by means of heating the multi-layer polymeric material such that the upper surface of the multi-layer polymeric material is bonded to the lower surface of the multi-layer polymeric material. The overlap side seam forms the longitudinal weld 110. Said longitudinal weld 110 can be visible from the outside of the tube 1. According to an embodiment, the longitudinal weld 110 is non-visible.

In an embodiment not shown, the longitudinal weld is obtained by placing edges of a multi-layer polymeric material 200 forming the skirt opposite each other so that the multi-layer polymeric material is in a tubular configuration, i.e., such that the two edges of the multi-layer polymer material 200 are edge to edge.

As represented in FIGS. 2 and 3, said flexible tube skirt 100 is intended to be fixed to the tube head 10 in order to form the flexible tube 1. The tube head 10 is advantageously over moulded on the skirt 100. The skirt 100 is advantageously fixed to the shoulder periphery. Said tube head 10 is advantageously made of PE but can be made in any other suitable material such as PP (polypropylene). The tube head can be produced as a separate piece of plastic and then attached to the skirt by heating the edge of the shoulder and the edge of the skirt and compress them together.

Figure 6:
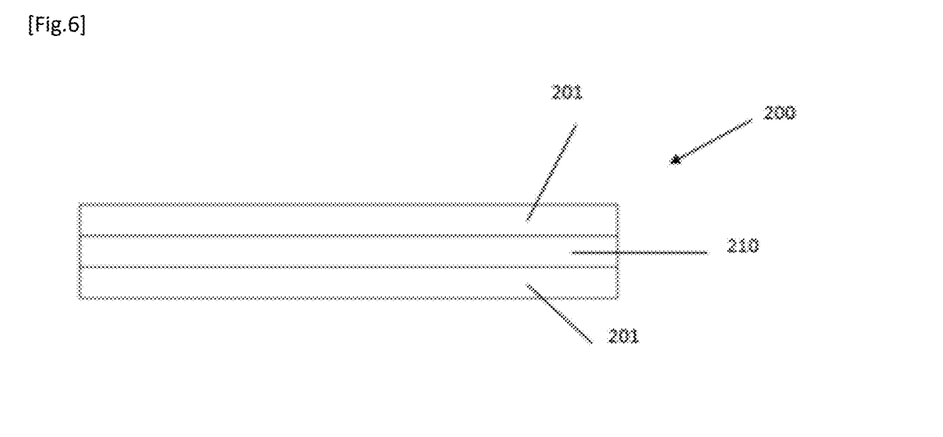
FIG. 6 is a schematic diagram of the layers that form the multi-layer polymeric material according to a first embodiment of the present invention.
Figure 7:
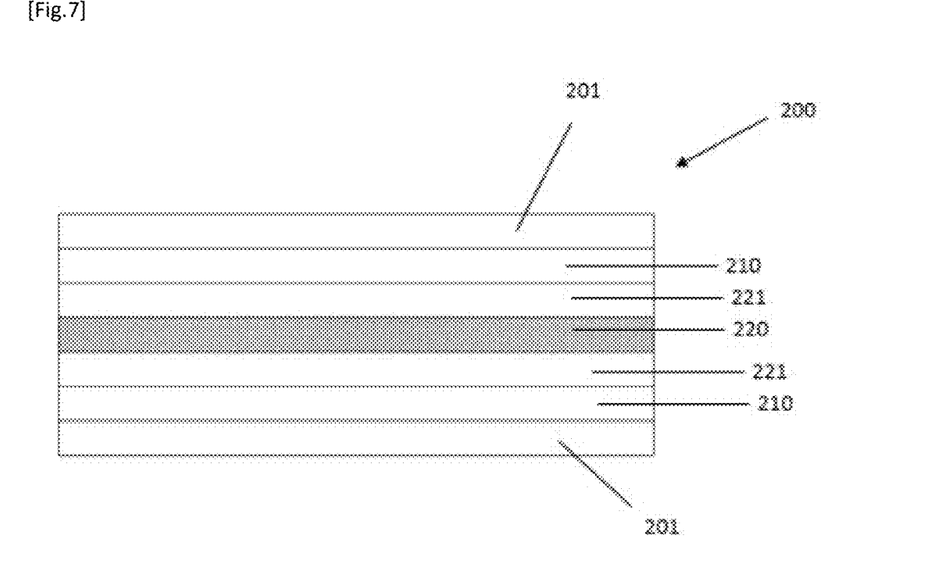
FIG. 7 is a schematic diagram of the layers that form the multi-layer polymeric material according to a second embodiment of the present invention.

Embodiments of the structures of the multi-layer polymeric material 200 according to the invention are illustrated at FIGS. 6 and 7.

Said multi-layer polymeric material 200 can be produced according to two methods involving a step of pushing action towards the interior of the sheet, such as casting co-extrusion process or calendaring co-extrusion process.

The multi-layer polymeric material 200, according to the invention, is produced with a step of pushing action towards the interior of the sheet, here as a cast sheet or as a calendered sheet with no subsequent extrusion or lamination step.

Casting co-extrusion process or calendaring co-extrusion process are already well known to produce multilayer sheets.

Figure 8:
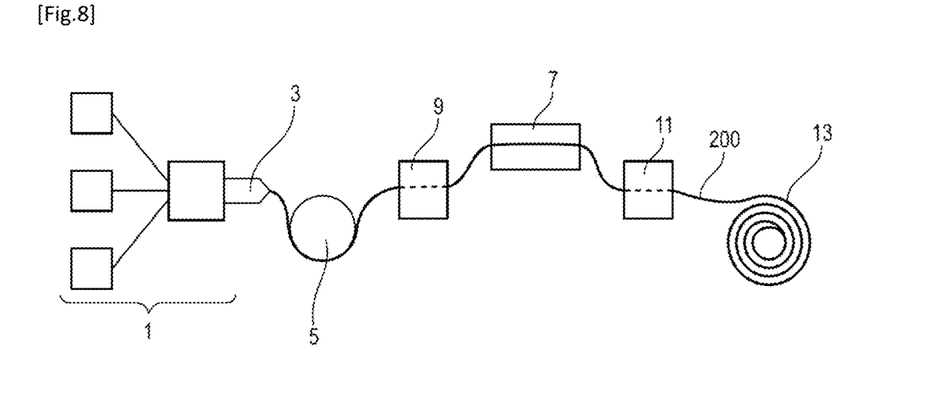
FIG. 8 schematically illustrates a device implementing a casting co-extrusion process to manufacture a multi-layer polymeric material of FIG. 6 or 7.

FIG. 8 schematically illustrates a device implementing a casting co-extrusion process to manufacture a multi-layer polymeric material 200 according to the invention.

In a casting co-extrusion process, the melted resins for each layer come from separate extruders 1 and are layered one on top of the other. As the melt as exits a die 3, it contacts a casting roll 5 (step of pushing action towards the interior of the sheet) and it is then cooled, for example on a cooling roll 7 to form a multi-layer polymeric material 200. Some further steps of treatments 9, 11 may take place before and after the cooling step. Finally, the multi-layer polymeric material 200 is wound on a winding drum 13 to be subsequently used to form the skirt 100 of the flexible tube container 1.

Figure 9:
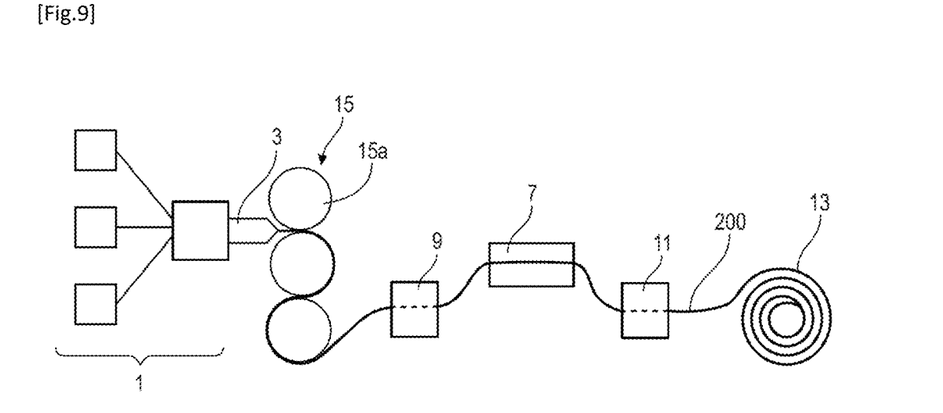
FIG. 9 schematically illustrates a device implementing a calendering co-extrusion process to manufacture a multi-layer polymeric material of FIG. 6 or 7.

FIG. 9 schematically illustrates a device implementing a calendering co-extrusion process to manufacture a multi-layer polymeric material 200 according to the invention.

In a calendering co-extrusion process, the melted resins for each layer come from separate extruders 1 and are layered one on top of the other. As the melt as exits a die 3, it passes through a calender 15, i.e., a series of hard pressure rollers roll 15a (step of pushing action towards the interior of the sheet) and it is then cooled, for example on a cooling roll 7 to form a multi-layer polymeric material 200. Some further steps of treatments 9, 11 may take place before and after the cooling step. Finally, the multi-layer polymeric material 200 is wound on a winding drum 13 to be subsequently used to form the side wall 100 of the flexible tube container 1.

According to the invention, the process does not comprise subsequent extrusion or lamination step.

Particularly, the process does not comprise subsequent extrusion or lamination step after the multi-layer polymeric material 200 is wound on the winding drum 13.

Advantageously, a complete multi-layer polymeric material 200 is obtained by a method involving a step of pushing action towards the interior of the sheet, such as casting method or calendering method. In other word, the multi-layer polymeric material is not a material obtained by assembling individual layers pre-made by any method.

The multi-layer polymeric material 200 forming the skirt 100 of the tube 1 comprises two PE based surface layers 201 and at least one PE based inner layer 210 between the surface layers 201.

According to the invention, the multi-layer polymeric material 200 comprises a thickness of between 200 and 400 micrometers. Advantageously, the multi-layer polymeric material comprising a thickness of between 200 and 370 micrometers, preferably between 200 and 350 micrometers, more preferably between 200 and 330 micrometers.

The multi-layer polymer material 200 according to the invention can comprises one or a plurality of inner layer(s) 210.

The inner layers can be of the same composition, or of different composition. The inner layers can be of the same thickness or of different thickness.

Same composition means consisting of a polymer or a mixture of several polymers in identical proportions, said polymer(s) being produced from monomers with the same chemical composition and substantially the same average molar mass.

The multi-layer polymer material 200 of example 1 illustrated at FIG. 6 is a three layer polymer material 200 and it comprises one inner layer 210.

The multi-layer polymer materials 200 of examples 2 to 9 illustrated at FIG. 7 are seven layer polymeric material and they comprise a plurality of inner layers 210.

In other embodiments not illustrated, the multi-layer polymeric material can comprise five layers or nine layers.

The surface layers 201 correspond to the outermost layer and the innermost layer of the multi-layer polymeric material 200.

According to the invention, the outermost layer is made of virgin polyolefin and at least one layer is made of post-consumer resin or recycled material.

Advantageously, layer made of post-consumer resin or recycled material is an inner layer.

We mean by "post-consumer resin or post-consumer recycled material" (PCR material), a material from reprocessed plastics generated by households or commercial, industrial and institutional facilities in their role of end user, a material from a content that can no longer be used for the purpose for which it was designed, according to, for example, the definition of the ISO 14021:2016 standard.

Typically, those skilled in the art understand that it is not a material from pre-consumer material, also called post-process recycled material or regrind scrap that is collected at the plastic molding factory during the process.

As "recycled", we understand a characteristic of a product, packaging or associated component that can be diverted from the waste stream through available processes and programs and can be collected, processed and returned to use in the form of raw materials or products.

Advantageously, the post-consumer resin or recycled material represents at least 20% wt of the multi-layer polymeric material, or at least 30% wt of the multi-layer polymeric material, or even at least 50% by weight of the multilayer polymeric material, or even at least 60% wt of the multi-layer polymeric material.

Advantageously, the post-consumer resin or recycled material is PE, and preferentially, the post-consumer resin or recycled material is HDPE.

PE with higher density allows a better moisture barrier than PE with lower density.

The at least one layer of post-consumer resin or recycled material can comprise master batch such as colorant master batch like white master batch and/or anti-UV additive and/or other additives known of the one skill in the art.

White master batch gives color opacity to the multi-layer polymeric material 200. Opaque sheet helps to protect the customer formula by blocking UV-A and UV-B light and it also offers contrast for surface printing.

The white master batch is a solid additive for plastic used for coloring plastics, it comprises 70% in mass of titanium dioxide ($TiO_2$).

Advantageously, the at least one layer of post-consumer resin or recycled material is one or a plurality of inner layer(s) and preferentially, the at least one layer of post-consumer resin or recycled material is adjacent to the outermost layer.

Advantageously, the surface layers are of the same composition.

Advantageously, the surface layers are made of PE, and preferentially made of LLDPE. MDPE can also be used.

It has been determined by the applicant that the use of LLDPE surface layers allows good welding and sealing behavior, especially when forming the longitudinal weld 110.

Moreover, PE with lower density is easier to process than PE with higher density.

Advantageously, the surface layers are not necessary of the same thickness.

Advantageously, the outermost layer has a thickness of at most 60 µm, or even of at most 55 µm, or even of at most 50 µm, or even of at most 45 µm, or even of at most 35 µm, or even of at most 30 µm.

Advantageously, the outermost layer has a thickness of at least 20 µm, or even of at least 30 µm, or even of at least 40 µm.

Advantageously, the outermost layer has a thickness comprises between 20 and 55 µm, or even 20 and 45 µm, or even 20 and 35 µm, or even 20 and 25 µm, or even 30 and 50 µm, or even 40 and 50 µm.

Preferably, the structure of the multi-layer polymeric material is symmetrical, in particular in terms of composition.

However, the symmetrical layers in terms of composition can be of different thickness. Thus, the outermost layer and the innermost layer can both be made of virgin PE, such a virgin LLPDE or a virgin MDPE, but the outermost layer and the innermost layer can have different thickness.

With co-extrusion casting or calendering process, the multi-layer polymeric material 200 is compressed during its passage in the casting roll 5 or in calender 15 (step of pushing action towards the interior of the sheet). The pushing action of the rolls involves, as a result, a smooth surface. Indeed, the particles of the PCR layer are pushed towards in the interior of the sheet and covered with the virgin PE outermost layer.

Before printing, the particles are still visible through the clear virgin PE layer but the particles cannot be felt anymore and do not interfere in the surface printing process like flexo printing, digital printing, screen printing, or other printing methods known of the one skilled in the art.

The multi-layer polymeric material according to the invention offers a very good surface quality particularly well adapted for cosmetic segment aesthetic requirements as the defects linked to the use of PCR are removed and hides.

Advantageously, the number of defects with an area greater than 0.5 mm$^2$ located on the outermost layer is under 5 defects/sqm, or even under 3 defects/sqm, or even under 2 defects/sqm, or even under 1 defects/sqm, or even under 0.5 defects/sqm.

The defects (gels or spot) on the sheet are measured by the AVT camera on the printing machine.

Advantageously, the multi-layer polymeric material 200 can comprise at least one barrier layer 220. Preferentially, the at least one barrier layer 220 is made of EVOH. Such barrier layer 220 has good barrier effect with regard to oxygen and to flavors.

Advantageously, the multi-layer polymeric material comprises tie layers 221 on both side of each barrier layer. These tie layers 221 improve the bonding between the barrier layer and the adjacent inner layers 210.

The tie layer can be a LLDPE tie layer or an EMA based tie layer, or any known tie layer.

The following structures are exemplary embodiments of multi-layer polymeric material 200 according to the present invention. The invention is not restricted to the specific multi-layer polymeric material of the exemplary embodiments but encompasses other multi-layer polymeric material structures falling within the scope of the appended claims.

The different layers of these exemplary embodiments of multi-layer polymeric material are described starting from the external surface layer, i.e., the intended outer surface uppermost, to the internal surface layer, i.e., the intended inner (product-contacting) surface lowermost.

Example 1

This example corresponds to the embodiment schematically represented at FIG. 6. Said example 1 is constituted of three layers:
- a outermost surface layer 201 made of LLDPE, and having a thickness of 52 µm,
- a inner layer 210 comprising PCR HDPE, LLDPE and white master batch, and having a thickness of 226 µm,
- an innermost surface layer 201 made of LLDPE and having a thickness of 52 µm.

The multi-layer polymeric material of example 1 has a thickness of 330 µm.

The multi-layer polymeric material of example 1 comprises 58% of PCR HDPE.

Example 2

This example corresponds to the embodiment schematically represented at FIG. 7. Said example 2 is constituted of seven layers:
- a outermost surface layer 201 made of LLDPE, and having a thickness of 48 µm,
- a first inner layer 210 comprising PCR HDPE and white master batch, and having a thickness of 110 µm,
- a LLDPE tie layer 221 having a thickness of 8 µm,
- a non-metallic barrier layer 220 made of EVOH, and having a thickness of 16 µm,
- a LLDPE tie layer 221 having a thickness of 8 µm,
- a second inner layer 210 comprising PCR HDPE and white master batch, and having a thickness of 110 µm,
- an innermost surface layer 201 made of LLDPE and having a thickness of 30 µm.

The multi-layer polymeric material of example 2 has a thickness of 330 µm. The multi-layer polymeric material of example 2 comprises 62% of PCR HDPE.

Example 3

This example corresponds to the embodiment schematically represented at FIG. 7.

Said example 3 is constituted of seven layers:
- a outermost surface layer 201 made of LLDPE, and having a thickness of 30 µm,
- a first inner layer 210 comprising PCR HDPE and white master batch, and having a thickness of 84 µm,
- a LLDPE tie layer 221 having a thickness of 8 µm,
- a non-metallic barrier layer 220 made of EVOH, and having a thickness of 16 µm,
- a LLDPE tie layer 221 having a thickness of 8 µm,
- a second inner layer 210 comprising PCR HDPE and white master batch, and having a thickness of 84 µm,
- an innermost surface layer 201 made of LLDPE, and having a thickness of 20 µm.

The multi-layer polymeric material of example 3 has a thickness of 249 µm.

The multi-layer polymeric material of example 3 comprises 62% of PCR HDPE.

Example 4

This example corresponds to the embodiment schematically represented at FIG. 7. Said example 4 is constituted of seven layers:
- a outermost surface layer 201 made of LLDPE, and having a thickness of 48 µm,
- a first inner layer 210 comprising PCR HDPE and anti-UV, and having a thickness of 110 µm,
- a LLDPE tie layer 221 having a thickness of 8 µm,
- a non-metallic barrier layer 220 made of EVOH, and having a thickness of 16 µm,
- a LLDPE tie layer 221 having a thickness of 8 µm,
- a second inner layer 210 comprising PCR HDPE and anti UV, and having a thickness of 110 µm,
- an innermost surface layer 201 made of LLDPE and having a thickness of 30 µm.

The multi-layer polymeric material of example 4 has a thickness of 330 µm.

The multi-layer polymeric material of example 4 comprises 63.5% of PCR HDPE.

Example 5

This example corresponds to the embodiment schematically represented at FIG. 7. Said example 5 is constituted of seven layers:
- a outermost surface layer 201 made of LLDPE, and having a thickness of 25 µm, a first inner layer 210 comprising PCR HDPE and white master batch, and having a thickness of 75 μm,
a LLDPE tie layer 221 having a thickness of 8 μm,
a non-metallic barrier layer 220 made of EVOH, and having a thickness of 11 μm,
a LLDPE tie layer 221 having a thickness of 8 μm,
a second inner layer 210 comprising PCR HDPE and white master batch, and having a thickness of 75 μm,
an innermost surface layer 201 made of LLDPE, and having a thickness of 17 μm.

The multi-layer polymeric material of example 5 has a thickness of 219 μm.

The multi-layer polymeric material of example 5 comprises 64.5% of PCR HDPE.

Example 6

This example corresponds to the embodiment schematically represented at FIG. 7. Said example 6 is constituted of seven layers:
a outermost surface layer 201 made of LLDPE, and having a thickness of 21 μm,
a first inner layer 210 comprising PCR HDPE and white master batch, and having a thickness of 75 μm,
a LLDPE tie layer 221 having a thickness of 8 μm,
a non-metallic barrier layer 220 made of EVOH, and having a thickness of 16 μm,
a LLDPE tie layer 221 having a thickness of 8 μm,
a second inner layer 210 comprising PCR HDPE and white master batch, and having a thickness of 75 μm,
an innermost surface layer 201 made of LLDPE, and having a thickness of 17 μm.

The multi-layer polymeric material of example 6 has a thickness of 220 μm.

The multi-layer polymeric material of example 6 comprises 63.1% of PCR HDPE.

Example 7

This example corresponds to the embodiment schematically represented at FIG. 7. Said example 7 is constituted of seven layers:
a outermost surface layer 201 made of LLDPE, and having a thickness of 45 μm,
a first inner layer 210 comprising LLDPE and white master batch, and having a thickness of 51.5 μm,
a LLDPE tie layer 221 having a thickness of 8 μm,
a non-metallic barrier layer 220 made of EVOH, and having a thickness of 11 μm,
a LLDPE tie layer 221 having a thickness of 8 μm,
a second inner layer 210 comprising PCR HDPE, and having a thickness of 51.5 μm,
an innermost surface layer 201 made of LLDPE, and having a thickness of 45 μm.

The multi-layer polymeric material of example 7 has a thickness of 220 μm.

The multi-layer polymeric material of example 7 comprises 23.4% of PCR HDPE.

Example 8

This example corresponds to the embodiment schematically represented at FIG. 7. Said example 8 is constituted of seven layers:
a outermost surface layer 201 made of LLDPE or MDPE, and having a thickness of 48 μm,
a first inner layer 210 comprising PCR HDPE, LLDPE and white master batch, and having a thickness of 110 μm,
a EMA based tie layer 221 having a thickness of 8 μm,
a non-metallic barrier layer 220 made of EVOH, and having a thickness of 16 μm,
a EMA based tie layer 221 having a thickness of 8 μm,
a second inner layer 210 comprising PCR HDPE, LLDPE and having a thickness of 110 μm,
an innermost surface layer 201 made of LLDPE or MDPE, and having a thickness of 30 μm.

The multi-layer polymeric material of example 8 has a thickness of 330 μm.

The multi-layer polymeric material of example 8 comprises 62% of PCR HDPE.

Example 9

This example corresponds to the embodiment schematically represented at FIG. 7. Said example 9 is constituted of seven layers:
a outermost surface layer 201 made of LLDPE or MDPE, and having a thickness of 48 μm,
a first inner layer 210 comprising PCR HDPE, HDPE and white master batch, and having a thickness of 110 μm,
a EMA based tie layer 221 having a thickness of 8 μm,
a non-metallic barrier layer 220 made of EVOH, and having a thickness of 16 μm,
a EMA based tie layer 221 having a thickness of 8 μm,
a second inner layer 210 comprising PCR HDPE, HDPE and having a thickness of 110 μm,
an innermost surface layer 201 made of LLDPE, and having a thickness of 30 μm.

The multi-layer polymeric material of example 9 has a thickness of 330 μm.

The multi-layer polymeric material of example 9 comprises 31% of PCR HDPE.

The following structures are comparative exemplary embodiments of multi-layer polymeric material.

The different layers of these comparative exemplary embodiments of multi-layer polymeric material are described starting from the external surface layer, i.e. the intended outer surface uppermost, to the internal surface layer, i.e. the intended inner (product-contacting) surface lowermost.

Comparative Example 1

The multi-layer polymeric material of comparative example 1 is produced using single step blown film and it is constituted of fourteen layers:
a first surface layer made of MDPE, and having a thickness of 76 μm,
a first inner layer made of MDPE, LLDPE and white master batch, and having a thickness of 22 μm,
a tie layer having a thickness of 8 μm,
a first non-metallic barrier layer made of EVOH, and having a thickness of 8 μm,
a tie layer having a thickness of 8 μm,
a second inner layer made of MDPE, LLDPE and white master batch and having a thickness of 22 μm,
two central layers made of PE plastomer having each a thickness of 21 μm,
a third inner layer made of MDPE, LLDPE and white master batch and having a thickness of 22 μm,
a tie layer having a thickness of 8 μm, a second non-metallic barrier layer made of EVOH, and having a thickness of 8 μm, a tie layer having a thickness of 8 μm, a fourth inner layer made of MDPE, LLDPE and white master batch and having a thickness of 22 μm, a second surface layer made of MDPE, and having a thickness of 76 μm.

The multi-layer polymeric material of comparative example 1 has a thickness of 330 μm.

The multi-layer polymeric material of comparative example 1 does not comprise PCR PE.

Comparative Example 2

The multi-layer polymeric material of comparative example 2 is produced using combination of blown film and lamination process and it is constituted of seven layers:

a first surface layer made of LLDPE/HDPE/LLDPE, and having a thickness of 200 μm, a first inner layer comprising PE and white master batch, and having a thickness of 30 μm, a tie layer having a thickness of 8-10 μm, a non-metallic barrier layer made of EVOH, and having a thickness of 15 μm, a tie layer having a thickness of 8-10 μm, a second inner layer comprising PE and white master batch, and having a thickness of 30 μm a second surface layer made of LLDPE/LLDPE, and having a thickness of 75 μm.

The multi-layer polymeric material of comparative example 2 has a thickness of 400 μm.

The multi-layer polymeric material of comparative example 2 does not comprise PCR PE.

Flexible tube containers according to the present invention were tested against prior art tubes used as controls to evaluate their quality.

Especially, a flexible 200 mL tube container with polypropylene slim cap comprising the multi-layer polymeric material of example 2 produced as a calendered sheet was tested and compared to flexible tube containers comprising multi-layer polymeric materials of comparative examples 1 and 2.

The results are presented in the table 1 below:

| Web Type | Comparative example 1 | Comparative example 2 | Example 2 |
| --- | --- | --- | --- |
| Total Thickness (μm) | 330 | 400 | 330 |
| PCR PE quantity container with cap (wt %) | 0 | 0 | 29% |
| Outermost layer thickness (μm) | 76 | 200 | 48 |
| Opacity (%) | 87% | 88% | 96% |
| Moisture vapor transmission rate gm/m$^2$ · day (at 38° C., 100% RH) | 0.6 | 0.6 | 0.4 |
| Oxygen transmission rate cm$^3$/m$^2$ · day (at 30° C., 50% RH) | 0.08 | 0.28 | 0.35 |
| Weight loss (w/w %) Water/ethanol | 0.50%/0.70% | 0.35%/0.80% | 0.17/0.18% |
| Tensile strength (MD, N/25com) | 165 | 138 | 165 |
| Stiffness-MD (N) | 7.8 | 8.5 | 4.8 |
| Rebound-MD (N) | 2.7 | 3.7 | 1.6 |
| Carbon footprint (g CO$_2$eq) | −9% | reference | −17% |

The Opacity is measured with benchtop spectrophotometers, notably on X-Rite i7, according to an internal method.

The Moisture Vapor Transmission Rate (MVTR) is measured with MOCON analyzer, the measure being notably realized according to the standard test method ASTM F1249. Lower values of MVTR indicate lower permeability, and so better moisture barrier.

The Oxygen transmission rate (OTR) is measured with oxygen permeation testing analyzer such as MOCON, the measure being notably realized according to the standard test method ASTM F1927. Lower values of OTR indicate lower permeability, and so a better protection from oxygen.

The weight loss is measured by comparing to the initial weight one month after being filled with water and ethanol and stored in an oven at 40° C. Lower values of Solvent loss (%) indicate lower permeability, and so a better barrier.

The Tensile strength is measured with a uniaxial tensile test machine by applying a load of 100 N. Higher values indicate better performance. The tube of example 2 resists well to damages if dropped or endured high pressures.

The Stiffness loss and the rebound loss are measured with a uniaxial tensile/compression machine on a 100×100 mm samples by applying a load of 30N.

Stiffness and rebound, named as haptics, are properties that impact the aesthetic and the formula restitution rate of a tube. The tube container of example 2 offers good supple haptics and an improved restitution rate avoiding formula waste.

The Carbon footprint loss is measured by a method based on the general guidelines from ISO 14040 series and the recommendations for Product Environmental Footprint (PEF) of the European Commission. The measure of carbon footprint loss shows life cycle assessment. The tube container of example 2 with 29% of PCR PE material permits to decrease significantly the carbon footprint.

The stress-cracking was also measured of tube containers of example 2. The stress-cracking was tested on sleeve and on head. The stress-cracking was evaluated on ten tubes with Igepal Co-630 at 10% in water in an oven at 50° C. The tubes were stored in vertical position on the end-seal and a pressure was applied manually every day for one month for the stress cracking test on sleeve. The tubes were stored in vertical position on the cap and a pressure was applied manually on the sleeve near the head every day for one month for the stress cracking test on sleeve. No defect was encountered directing the tests.

As it can be seen in this table 1, the multi-layer polymeric material 200 according to the invention shows similar or better results in term of quality perception but also in terms of chemical and mechanical resistance.

The invention claimed is:

1. A flexible tube container comprising:
 a side wall formed from a multi-layer polymeric material, the side wall comprising a longitudinal weld or join, the multi-layer polymeric material comprising a thickness of between 200 and 400 micrometers, said multi-layer polymeric material comprising at least one layer of virgin polyolefin based and at least one layer of post-consumer resin or recycled material,
 wherein the multi-layer polymeric material is produced with a step of pushing action towards an interior of the multi-layer polymeric material with no subsequent extrusion or lamination step, and the at least one layer of virgin polyolefin is an outermost layer and is free of post-consumer resin or recycled material,
 wherein the multi-layer polymeric material has no lamination layer and has a smooth outer surface as particles of the post-consumer resin are pushed towards the interior of the multiple-layer polymeric material and covered with the at least one layer of virgin polyolefin outermost layer.

2. The flexible tube container according to claim 1, wherein the multi-layer polymeric material is produced as a cast sheet or a calendered sheet.

3. The flexible tube container according to claim 1, wherein the post-consumer resin or recycled material represents at least 30% wt of the multi-layer polymeric material.

4. The flexible tube container according to claim 1, wherein the at least one layer of post-consumer resin or recycled material is an inner layer.

5. The flexible tube container according to claim 1, wherein the at least one layer of post-consumer resin or recycled material is adjacent to the outermost layer.

6. The flexible tube container according to claim 1, wherein the multi-layer polymeric material comprises at least one barrier layer.

7. The flexible tube container according to claim 1, wherein the multi-layer polymeric material comprises tie layers on both side of each barrier layer.

8. The flexible tube container according to claim 1, wherein the multi-layer polymeric material comprises surface layers, the surface layers are of the same composition.

9. The flexible tube container according to claim 8, wherein the surface layers are made of LLDPE.

10. The flexible tube container according to claim 1, wherein a number of defects with an area greater than 0.5 $mm^2$ located on the outermost layer is under 5 defects/sqm.

11. The flexible tube container according to claim 1, wherein the multi-layer polymeric material comprises at least three layers.

12. The flexible tube container according to claim 1, wherein the post-consumer resin or recycled material is HDPE.

13. The flexible tube container according to claim 1, wherein the at least one layer of post-consumer resin or recycled material comprises master batch and/or anti-UV additive.

14. The flexible tube container according to claim 1, wherein the outermost layer has a thickness of at most 60 μm.

15. The flexible tube container according to claim 1, comprising a tube head and/or a cap, the post-consumer resin or recycled material represents at least 20% wt of the container.

16. The flexible tube container according to claim 6, wherein the at least one barrier layer is made of EVOH.

* * * * *